United States Patent [19]
Ueda et al.

[11] Patent Number: 5,414,415
[45] Date of Patent: May 9, 1995

[54] CROSS-CONNECT APPARATUS CAPABLE OF AVOIDING A SUPERFLUOUS DETOUR ROUTE THEREIN

[75] Inventors: Hiromi Ueda; Ikuo Tokizawa; Kazuo Iguchi; Haruo Yamashita, all of Kanagawa; Takatoshi Kurano; Motoo Nishihara, both of Tokyo, all of Japan

[73] Assignees: Nippon Telegraph and Telephone Corp., Tokyo; Fujitsu Limited, Kanagawa; NEC Corporation, Tokyo, all of Japan

[21] Appl. No.: 15,651

[22] Filed: Feb. 9, 1993

[30] Foreign Application Priority Data

Feb. 10, 1992 [JP] Japan ................................. 4-056578

[51] Int. Cl.$^6$ ........................................... H01H 67/00
[52] U.S. Cl. ............................ 340/825.02; 340/825.8; 340/827; 340/825.01
[58] Field of Search .............. 340/825.01, 827, 825.8, 340/826, 825.02; 370/60.1, 60

[56] References Cited

U.S. PATENT DOCUMENTS

| | | | |
|---|---|---|---|
| 4,517,572 | 5/1985 | Dixon | 340/827 |
| 5,049,877 | 9/1991 | Cooperman et al. | 340/825.8 |
| 5,130,984 | 7/1992 | Cisneros | 370/60 |
| 5,153,578 | 10/1992 | Izawa et al. | 340/827 |
| 5,200,746 | 4/1993 | Yoshifuji | 340/825.8 |
| 5,239,537 | 8/1993 | Sakauchi | 340/827 |

Primary Examiner—Donald J. Yusko
Assistant Examiner—Edwin C. Holloway, III
Attorney, Agent, or Firm—Ostrolenk, Faber, Gerb & Soffen

[57] ABSTRACT

In a cross-connect apparatus for use in selectively connecting a plurality of input transmission paths to a plurality of output transmission paths, each of the input and the output transmission paths is divided into first through m-th groups each of which is composed of first through n-th transmission paths, first through m-th elementary switch modules are located between the input and the output transmission paths, n in number, of the first through the m-th groups and are connected to a connection switch module through first to m-th input internal path groups each of which is composed of n internal paths and which are extended into first through m-th switch units each of which has input terminals, $n(m-1)$ in number, and output terminals, n in number, where n and m are natural numbers. An i-th one of the switch units in the connection switch module is connected to the input path groups, $(m-1)$ in number, except an i-th internal path group, where i is a natural number between unity and m, both inclusive. The output terminals of the i-th switch unit is connected to an i-th one of the elementary switch modules through an i-th one of output internal paths. This structure serves to avoid an unnecessary detour route in the cross-connect apparatus.

4 Claims, 4 Drawing Sheets

CROSS-CONNECT APPARATUS CAPABLE OF AVOIDING A SUPERFLUOUS DETOUR ROUTE THEREIN

BACKGROUND OF THE INVENTION

This invention relates to a cross-connect apparatus for use in connecting transmission paths to one another and, in particular, to an ATM (asynchronous transfer mode) cross-connect apparatus.

Herein, it is to be noted that an ATM system serves to accomplish an ISDN (Integrated Services Digital Network) of a broadband which enables a wide variety of communication from a low speed digital signal, such as a speech data signal, to a high speed data signal, such as an image data signal carrying a moving image, by transmitting an ATM cell through a transmission path.

On the other hand, a cross-connect apparatus of the type described is similar in operation to a switch circuit included in a digital exchange but is used in a manner different from the switch circuit. More specifically, let consideration be made about an exchange system which comprises first and second exchanges connected directly to a first set of transmission paths. Under the circumstances, it is assumed that the first exchange must be also connected to a third exchange through a second set of transmission paths. In this event, the cross-connect apparatus is located among the first through the third exchanges.

In addition, such a cross-connect apparatus is also used in the case where unused transmission paths are newly used between adjacent exchanges to form semifixed routes between the adjacent exchanges.

Taking the above into consideration, the cross-connect apparatus comprises first through m-th elementary switch modules each of which is connected to a plurality of incoming or input transmission paths and a plurality of outgoing or output transmission paths, where m is a natural number. In each of the first through the m-th elementary switch modules, the incoming transmission paths are entered as first through n-th internal paths which are connected to an ATM multiplexer through an (n×n) ATM switch. The ATM multiplexer has a plurality of input ports equal in number to 2n and output ports, n in number. Moreover, the first through the m-th elementary switch modules are connected to one another through a connection switch module which is connected to the ATM multiplexers included in the first through the m-th elementary switch modules. Such a connection switch module also comprises first through m-th ATM switch units which are connected to the first through the m-th elementary switch modules and which may be called connection ATM switch units.

With this structure, each incoming transmission path in each of the first through the m-th elementary switch modules is not only connected directly to the outgoing transmission path of each elementary switch module but also is connected through the connection switch module to the same outgoing transmission path of each elementary switch module. This means that two routes are formed through internal paths in the conventional cross-connect apparatus, in spite of the fact that only one of the two routes is actually necessary while the remaining one of the two routes might be superfluous and may be a superfluous detour route.

In other words, each of the connection ATM switch units in the connection switch module has a superfluous capacity so as to accommodate the internal paths in the conventional cross-connect apparatus. Accordingly, the conventional cross-connect apparatus is expensive.

SUMMARY OF THE INVENTION

It is an object of this invention to provide a cross-connect apparatus which is inexpensive in comparison with the conventional cross-connect apparatus.

It is another object of this invention to provide a cross-connect apparatus of the type described, which is capable of saving a capacity of a connection ATM switch in a connection switch module.

It is still another object of this invention to provide a cross-connect apparatus of the type described, which is capable of avoiding formation of two routes in the cross-connect apparatus.

A cross-connect apparatus to which this invention is applicable is for use in connection between a plurality of input transmission paths and a plurality of output transmission paths. The input transmission paths are divided into first through m-th input path groups each of which is composed of a plurality of the input transmission paths, n in number, while the output transmission paths are divided into first through m-th output path groups each of which is composed of a plurality of the output transmission paths, where n and m are natural numbers. According to this invention, the cross-connect apparatus comprises first through m-th elementary switch modules between the first through the m-th input path groups and the first through the m-th output path groups, respectively, for forming a route in each of the first through the m-th elementary switch modules by selecting first through n-th internal paths in each of the first through the m-th elementary switch modules, and a connection switch module which is connected to the first through the n-th internal paths extended from each of the first through the m-th elementary switch modules and which provides first through m-th sets of the first through the n-th internal paths, for forming an additional route among the first through the m-th elementary switch modules by selecting the first through the m-th sets of the first through the n-th internal paths. The first through the n-th internal paths of the first through the m-th sets are equal in number to n×m in total.

The connection switch module comprises first through m-th switch units each of which has input ports equal in number to (n(m−1)) and output ports equal in number to n and which are connected to the first through the m-th sets of the first through the n-th internal paths so that a k-th one of the first through the m-th switch units is connected to (m−1) sets except a k-th one of the first through the m-th sets of the first through the n-th internal paths, where k is a natural number between one and m, both inclusive, and output connecting means for connecting the output ports extended from the first through m-th switch units to the first through the m-th elementary switch modules to form the additional route.

DESCRIPTION OF THE PREFERRED EMBODIMENTS

Figure 1:
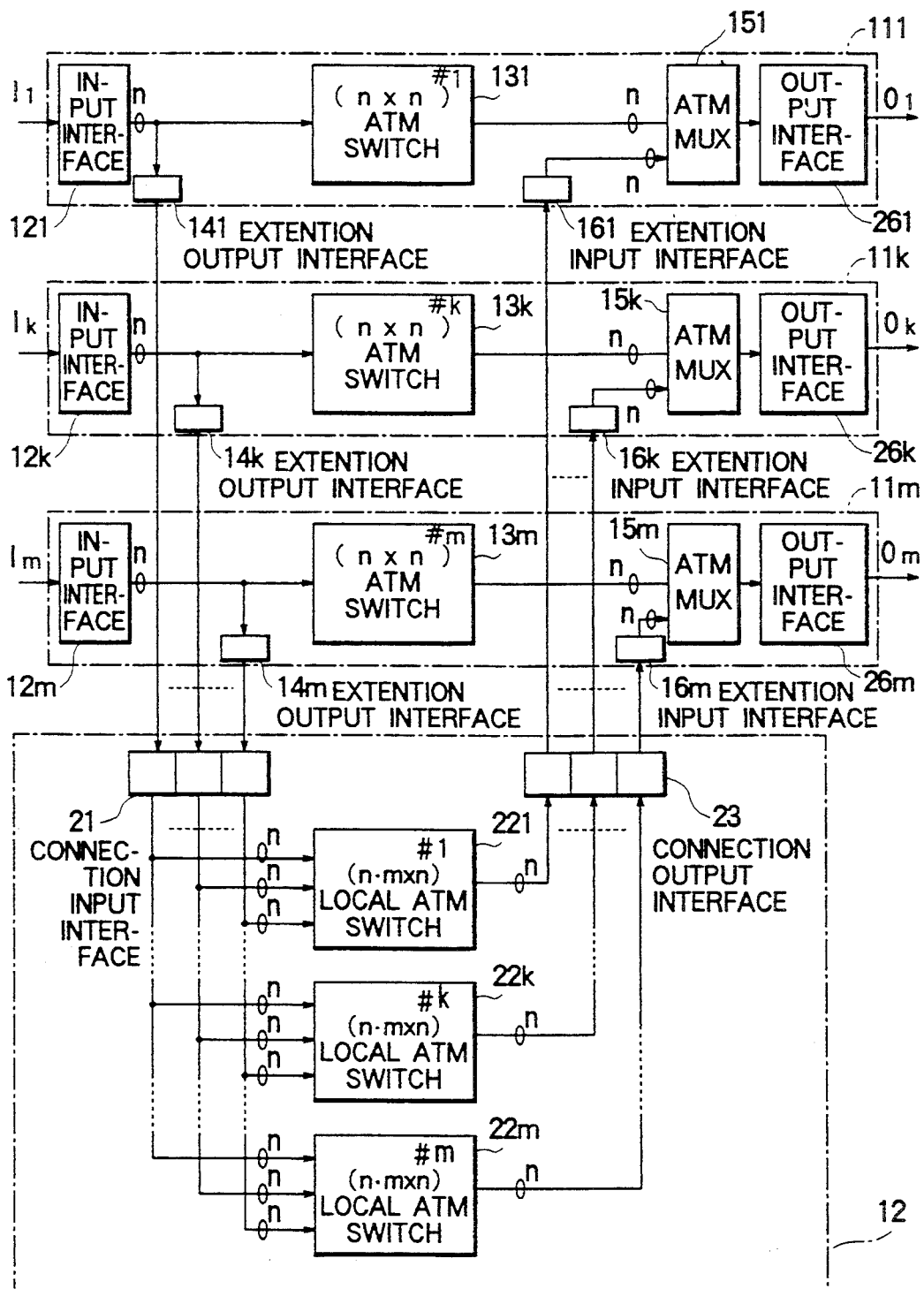
FIG. 1 is a block diagram of a conventional cross-connect apparatus.

Referring to FIG. 1, a conventional cross-connect apparatus is located between first through m-th incoming transmission path groups I1 to Im and first through m-th outgoing transmission path groups O1 to Om. In the example being illustrated, a k-th incoming transmission path group Ik and a k-th outgoing transmission path group Ok are also illustrated together with the first and the m-th incoming transmission path groups I1 and Im and the first and the m-th outgoing transmission path groups O1 and Om, where k is a natural number between one and m, both inclusive. It is assumed that each transmission path group, such as I1, Im, O1, Om, is composed of transmission paths equal in number to n, where n is a natural number, although each path group is depicted at a single line.

The illustrated conventional cross-connect apparatus comprises first, . . . , k-th, . . . , m-th elementary switch modules 111, . . . , 11k, . . . , 11m which are connected to the first, . . . , k-th, . . . , m-th incoming path groups I1, . . . , Ik, . . . , Im, respectively, and which are also connected to the first, . . . , k-th, . . . , m-th outgoing path groups O1, . . . , Ok, . . . , Om, respectively. In addition, the cross-connect apparatus further comprises a connection switch module 12 connected to the first through the m-th elementary switch modules 111 to 11m in a manner to be described later in detail.

Herein, it is assumed that each of the first through the m-th elementary switch modules 111 to 11m is similar in structure and operation to one another. Therefore, description will be mainly made only about the first elementary switch module 111.

The illustrated first elementary switch module 111 comprises an input interface 121 connected to the incoming transmission path group I1 which is entered as first through n-th internal paths depicted at n in FIG. 1. The first through the n-th internal paths are connected to an ATM switch 131 of (n×n) on one hand and to an extension output interface 141 on the other hand. The ATM switch 131 may be referred to as an (n×n) ATM switch hereinunder. In addition, the first elementary switch module 111 further comprises a first ATM multiplexer 151 having input ports equal in number to 2n and output ports equal in number to n. Consequently, the ATM multiplexer 151 has a ratio of 2 to 1 between the input and the output ports and will be called a (2:1) multiplexer.

As shown in FIG. 1, the n input ports of the ATM multiplexer 151 are connected to the (n×n) ATM switch 131 while the remaining n input ports thereof are connected to an extension input interface 161.

Further referring to FIG. 1, the connection switch module 12 comprises a connection input interface 21 connected to the first through the m-th extension output interfaces 141 to 14m included in the first through the m-th elementary switch modules 111 to 11m. Inasmuch as the internal paths, n in number, are extended from each extension output interface 141 to 14m of the first through the m-th elementary switch modules 111 to 11m, as mentioned before, the connection input interface 21 is connected to the internal paths equal in number to (n×m) and is divided into first through m-th portions for the respective elementary switch modules 111 to 11m, although the illustrated connection input interface 21 is divided into only three portions for the first, the k-th, and the m-th elementary switch modules 111, 11k, and 11m. At any rate, each of the first through the m-th portions of the connection input interface 21 is connected to the internal paths, n in number, and is connected to first through m-th local ATM switches 221 to 22m. In this connection, each of the first, through the m-th local ATM switches 221 to 22m is connected to local input lines which are extended from the first through the m-th portions of the connection input interface 21 and which are equal in number to (n×m), as illustrated in FIG. 1. In addition, each of the first through the m-th local ATM switches 221 to 22m is connected to a connection output interface 23 through local output lines of n in number. Accordingly, the first through the m-th local ATM switches 221 to 22m may be referred to as (n.m×n) ATM switches or may be called connection switch units so as to distinguish between the ATM switches 13 (suffixes omitted) and the local ATM switches 22.

From this fact, it is readily understood that the connection output interface 23 is divided into first through m-th portions connected to the first through the m-th local ATM switches 221 to 22m through the local output lines, respectively. As a result, the local output lines which are connected to the connection output interface 23 are equal in number to (n×m) in total.

The first through the m-th portions of the connection output interface 23 are joined to the first through the m-th extension input interfaces 161 to 16m through first through m-th sets of output internal paths each of which is equal in number to n.

Thus, the first through the m-th sets of the output internal paths are connected to the first through the m-th ATM multiplexers 151 to 15m through the extension input interfaces 161 to 16m included in the first through the m-th elementary switch modules 111 to 11m, respectively. Each of the ATM multiplexers 151 to 15m is connected to 2n lines which are extended from the (n×n) ATM switch 13 (suffixes omitted) and the extension input interface 16 through the input ports, 2n in number, as mentioned before. The output ports, n in number, of the first through the m-th ATM multiplexers 15 are connected through first through m-th output interfaces 261 to 26m to the first through the m-th output path groups O1 to Om, respectively.

Herein, let consideration be made as regards inside routes formed in the cross-connect apparatus illustrated in FIG. 1. For example, it is assumed that an ATM cell is received by the input interface 121 of the first elementary switch module 111 to be sent to both the ATM switch 131 and the extension output interface 141. Under the circumstances, if the ATM cell can be sent through the ATM switch 131, such an ATM cell is delivered to the first output transmission path group O1 through the ATM switch 131 and the output interface 261. Thus, a single inside route is formed through the ATM switch 131 and the ATM multiplexer 151 to the first output transmission path group O1 when the ATM cell should be delivered to the first output transmission path group O1.

On the other hand, let the ATM cell be given to the first elementary switch module 111 and be delivered to another one of the elementary switch modules that is different from the first elementary switch module 111 and that may be the k-th elementary switch module 11k. In this event, the ATM cell in question is sent from the input interface 121 through the extension output interface 141 and the connection switch module 12 to the k-th elementary switch module 11k. In the k-th elementary switch module 11k, the ATM cell is sent to the output transmission path group Ok through the route which is formed by the extension input interface 16k, the ATM multiplexer 15k, and the output interface 26k. Thus, the above-mentioned route is formed by switching the k-th (n.m×n) ATM switch 22k included in the connection switch module 12.

With this structure, even when an ATM cell which is given to one of the elementary switch modules, for example, the first elementary switch module 111 is sent through the same elementary switch module 111 to the output transmission path group, such as O1, an unnecessary detour route may often be formed as regards such an ATM cell through the extension output interface 141, the (n.m×n) local ATM switch 22 of the connection switch module 12, and the first elementary switch module 111. As a result, two of the inside routes are often superfluously formed in the illustrated cross-connect apparatus. Therefore, the illustrated cross-connect apparatus has shortcomings as pointed out in the preamble of the instant specification.

Figure 2:
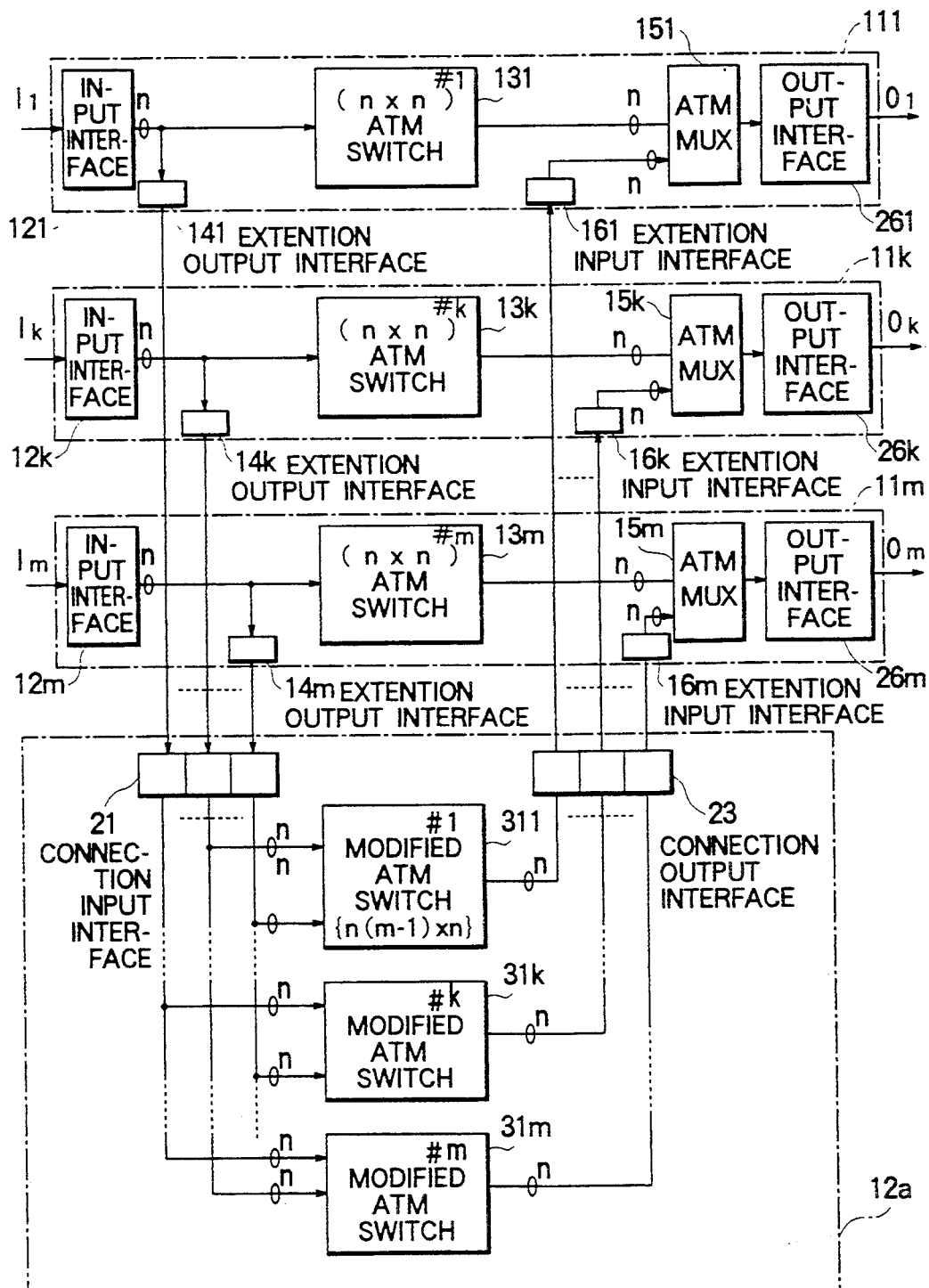
FIG. 2 is a block diagram of a cross-connect apparatus according to a first embodiment of this invention.

Referring to FIG. 2, a cross-connect apparatus according to a first embodiment of this invention is similar in structure to that illustrated in FIG. 1 except that a connection switch module is somewhat modified from that shown in FIG. 1 and will be depicted at 12a in FIG. 2. More particularly, the cross-connect apparatus illustrated in FIG. 1 comprises first through m-th elementary switch modules 111 to 11m each of which is identical with one another and comprises similar parts and elements designated by like reference numerals and symbols. In this connection, each of the first through the m-th elementary switch modules 111 to 11m. Therefore, description will be mainly directed to the connection switch module 12a.

In FIG. 2, the illustrated connection switch module 12a comprises a connection input interface 21 connected to the first through the m-th extension output interfaces 141 to 14m of the first through the m-th elementary switch modules 111 to 11m and a connection output interface 23 connected to the first through the m-th extension input interfaces 161 to 16m in a manner similar to that illustrated in FIG. 1. In this connection, each of the connection input interface 21 and the connection output interface 23 may be identical with that illustrated in FIG. 1 and is divided into first through m-th portions. Each of the first through the m-th portions in each of the connection input interface 21 and the connection output interface 23 is connected to internal paths, n in number. Herein, the numbers n and m may be equal to eight and four, respectively.

Moreover, the illustrated connection switch module 12a further comprises first through m-th modified ATM switches 311 to 31m which are somewhat changed from the first through the m-th local ATM switches 221 to 22m illustrated in FIG. 1 and which are identical with one another. Each of the first through the m-th modified ATM switches 311 to 31m may be called a connection switch unit and is connected to the portions of the connection input interface 21 which are equal in number to (m−1). Inasmuch as the internal paths, n in number, are connected to each portion of the connection input interface 21 to be entered as local input lines (n in number) from each portion to the modified ATM switches in a manner to be presently described. Therefore, the local input lines of n(m−1) are connected to each of the first through the m-th modified ATM switches 311 to 31m and local output lines of n are extended from each modified ATM switch to the connection output interface 23.

As a result, each of the first through the m-th modified ATM switches 311 to 31m may be called an (n(m−1)×n) ATM switch. More specifically, the first modified ATM switch 311 is not connected to the first portion of the connection input interface 21 but to the remaining (m−1) portions of the connection input interface 21. Likewise, the k-th modified ATM switch 31k is not connected to the k-th portion of the connection input interface 21 but to the remaining (m−1) portions thereof. In addition, the m-th modified ATM switch 31m is connected to the (m−1) portions of the connection input interface 21 except for the m-th portion.

Furthermore, each of the first through the m-th modified ATM switches 311 to 31m is connected to each of the first through the m-th portions of the connection output interface 23 through the local output lines, n in number. This shows that the connection output interface 23 is connected to the first through the m-th modified ATM switches 311 to 31m through the local output lines of n×m, like in FIG. 1.

The first through the m-th portions of the connection output interface 23 are connected through the internal paths to the extension input interfaces 141 to 14m of the first through the m-th elementary switch modules 111 to 11m, respectively, in the manner illustrated in FIG. 1. The extension input interfaces 141 to 14m are connected to the ATM multiplexers 151 to 15m which are also connected to the (n×n) ATM switches 131 to 13m in the first through the m-th elementary switch modules 111 to 11m, respectively, as mentioned in conjunction with FIG. 1.

With this structure, only one of the internal routes is formed in the cross-connect apparatus when an ATM cell is received through one of the first through the m-th elementary switch modules 111 to 11m and is sent to the output transmission path group connected to the same elementary switch module. This means that no unnecessary detour route is formed within the illustrated cross-connect apparatus. In other words, a direct route alone is formed from the input transmission path group Ii to the output transmission path group Oi through the (n×n) ATM switch 13i in the elementary switch module 11i where i is a natural number between one and m, both inclusive, when the ATM cell is to be transmitted from the input transmission path group Ii to the output transmission path group Oi. This is because an unnecessary detour route is not formed between the extension output interface 14i and the extension input interface 16i through the connection switch module 12a, as readily understood from FIG. 2.

Any other operations are similar to those mentioned in conjunction with FIG. 1 and will not be described any longer.

Figure 3:
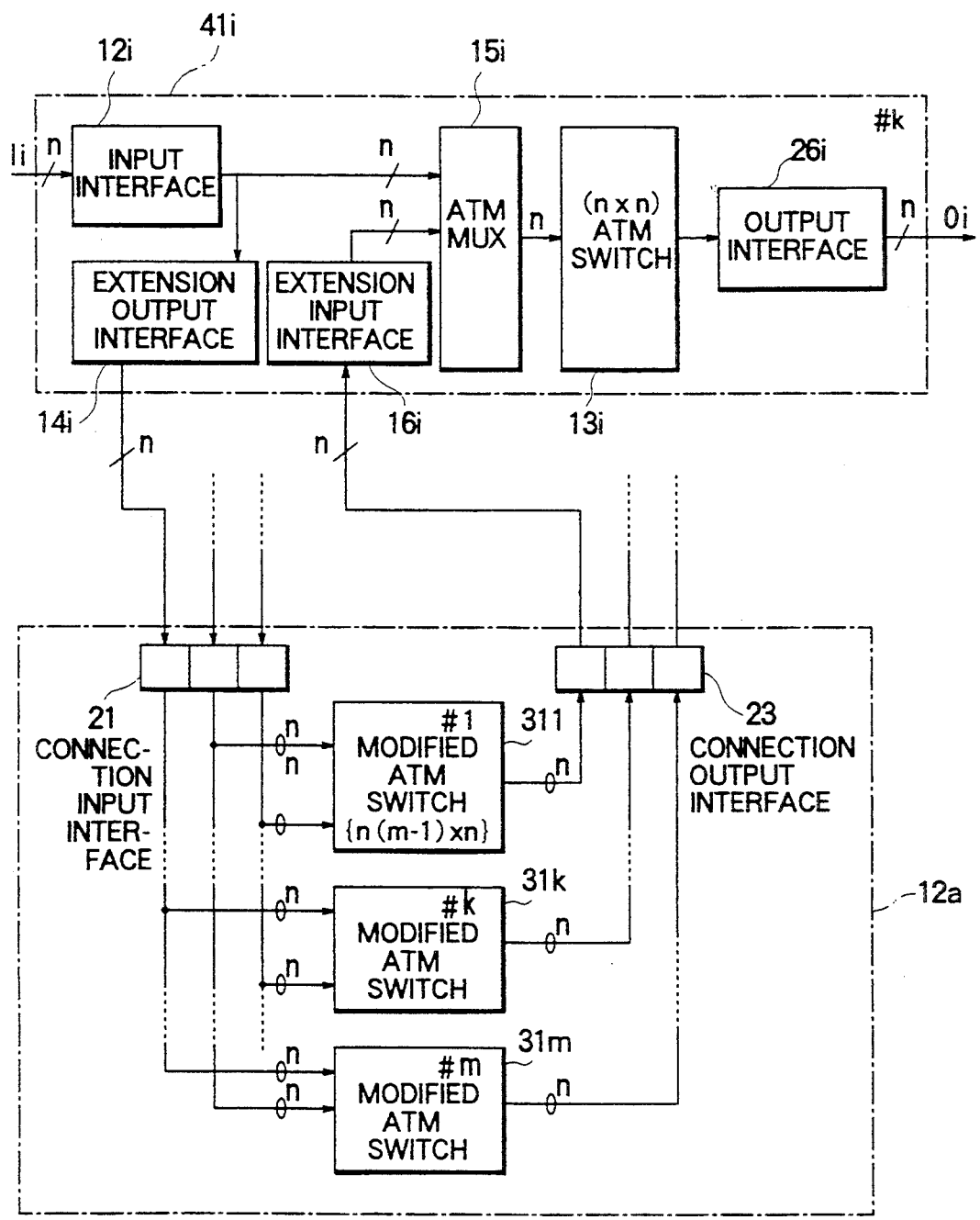
FIG. 3 is a block diagram of a cross-connect apparatus according to a second embodiment of this invention.

Referring to FIG. 3, a cross-connect apparatus according to a second embodiment of this invention comprises a connection switch module 12a which is similar in structure and operation to that illustrated in FIG. 2 and which is connected to first through m-th modified elementary switch modules specified by a single one of the modified elementary switch modules in FIG. 3. Taking this into consideration, the illustrated modified elementary switch module is depicted at 41i where i is a natural number between one and m, both inclusive.

In FIG. 3, it is to be noted that the modified elementary switch 41i comprises the ATM multiplexer 15i located prior to the (n×n) ATM switch 13i. In other words, positions of the ATM multiplexer 15i and the (n×n) ATM switch 13i are changed from the positions of the (n×n) ATM switch and the ATM multiplexer illustrated in FIG. 2. Like in FIG. 2, the ATM multiplexer 15i has the input ports equal in number to 2n and the output ports equal in number to n. The input interface 12i is connected to the n input ports of the ATM multiplexer 15i through the n internal paths while the extension input interface 16i is connected to the other n input ports of the ATM multiplexer 15i through the other internal paths, n in number. The n output ports of the ATM multiplexer are connected to the (n×n) ATM switch 18i.

The connection switch module 12a comprises the first through the m-th modified switch modules 311 to 31m connected to the connection input interface 21 in the manner mentioned with reference to FIG. 2.

With this structure, it is also possible to form the routes between the input transmission path groups I1 to Im and the output transmission path groups O1 to Om without forming a superfluous route in the cross-connect apparatus, as described in conjunction with FIG. 2.

Figure 4:
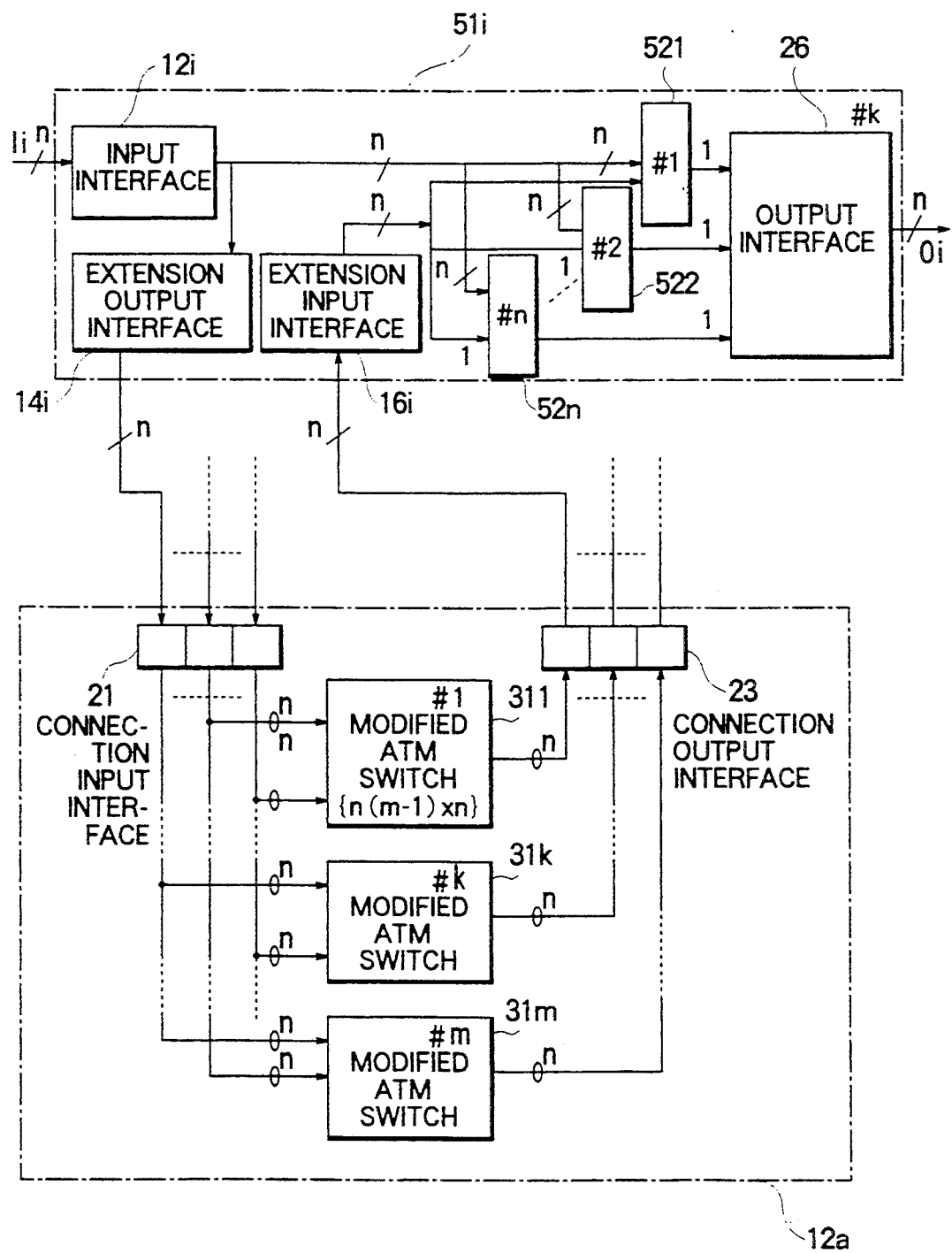
FIG. 4 is a block diagram of a cross-connect apparatus according to a third embodiment of this invention.

Referring to FIG. 4, a cross-connect apparatus according to a third embodiment of this invention is similar in structure and operation to that illustrated in FIG. 2 except that an elementary switch module has a structure different from that illustrated in FIG. 2 and is therefore depicted at 51i where i is variable between one and m, both inclusive. More particularly, the illustrated elementary switch module 51i comprises the input interface 12i, the extension output interface 14i, the extension input interface 16i, and the output interface 26i, like in FIG. 2.

Herein, it is to be noted that first through n-th ones 521 to 52n of ((n+1):1) ATM multiplexers are located between the input interface 12i and the output interface 26i and between the extension input interface 16i and the output interface 26i. From this fact, it is readily understood that each of the ((n+1):1) ATM multiplexers 521 to 52n has input ports equal in number to (n+1) and a single output port.

In each of the ((n+1):1) ATM multiplexers 521 to 52n, the input ports, n in number, are connected to the input interface 12i through the n internal paths while the remaining single input port is connected to one of the internal paths that is drawn from the extension input interface 16i. As a result, the n internal paths drawn from the extension input interface 16i are individually connected to the first through the n-th ATM multiplexers 521 to 52n one by one. The first through the n-th ATM multiplexers 521 to 52n are connected to the output interface 26i through a single internal path which is drawn as the output transmission path group Oi composed of n lines.

The remaining elementary switch modules are identical with the illustrated elementary switch module 51i and will not be described any longer.

As mentioned above, the connection switch module 12a comprises the first through the m-th modified ATM switches 311 to 31m which are identical with those illustrated in FIGS. 2 and 3 and which are connected to the connection input interface 21 and the connection output interface 23 in the above-mentioned manner. Therefore, the extension input interface 16 (suffix omitted) in each of the first through the m-th elementary switch modules 511 to 51m is connected to the connection output interface 23 of the connection switch module 12a in the manner illustrated in conjunction with FIG. 2.

Inasmuch as each of the first through the m-th modified ATM switches 311 to 31m is connected to (m−1) portions of the connection input interface, like in FIG. 2, no unnecessary detour route is formed through the connection switch module 12a except for a direct route when an ATM cell is given to a certain one of the elementary switch module and is transmitted through the same elementary switch module.

At any rate, it is possible to prevent a detour route from being unnecessarily formed within the cross-connect apparatus. In addition, the cross-connect apparatus makes each of the first through the m-th modified ATM switches small in comparison with the conventional cross-connect apparatus. This enables a reduction of manufacturing costs for the cross-connect apparatus.

While this invention has been described in conjunction with a few embodiments thereof, it will readily be possible for those skilled in the art to put this invention into practice in various other manners. For example, the cross-connect apparatus may be used to switch an STM (synchronous transfer mode) cell instead of the ATM cell, although description has been made only about the ATM cell.

What is claimed is:

1. A cross-connect apparatus for connection between a plurality of input transmission paths and a plurality of output transmission paths, said input transmission paths being divided into first through m-th input path groups each of which is composed of a plurality of the input transmission paths, n in number, while said output transmission paths are divided into first through m-th output path groups each of which is composed of a plurality of the output transmission paths, where n and m are natural numbers not smaller than two, said cross-connect apparatus comprising:

first through m-th elementary switch modules between said first through said m-th input path groups and said first through said m-th output path groups, respectively, for forming a route in each of said first through said m-th elementary switch modules by selecting first through n-th internal paths in each of said first through said m-th elementary switch modules; and a connection switch module which is connected to said first through said n-th internal paths extended from each of said first through said m-th elementary switch modules and which provides first through m-th sets of the first through the n-th internal paths, for forming an additional route among said first through said m-th elementary switch modules by selecting the first through the m-th sets of the first through the n-th internal paths, the first through the n-th internal paths of the first through the m-th sets being equal in number to (n×m) in total;

said connection switch module comprising:

first through m-th switch units each of which has input ports equal in number to (n(m−1)) and output ports equal in number to n and which are connected to said first through said m-th sets of the first through the n-th internal paths so that a k-th one of the first through the m-th switch units is connected to (m−1) sets except a k-th one of the first through the m-th sets of the first through the n-th internal paths, where k is a natural number between one and m, both inclusive; and output connecting means for connecting said output ports extended from the first through the m-th switch units to the first through the m-th elementary switch modules to form said additional route.

2. A cross-connect apparatus as claimed in claim 1, each of said first through said m-th elementary switch modules being specified by an i-th one of the first through the m-th modules where i is a natural number between one and m, both inclusive, wherein said i-th elementary switch module comprises:

an input interface connected to an i-th one of the first through the m-th input path groups for entering the i-th input path group as the first through the n-th internal paths of said i-th input path group;

an extension output interface connected to said input interface for extending said first through said n-th internal paths of said i-th input path group to said connection switch module;

a multiplexer having first and second sets of input ports and output ports equal in number to n, each of said first and said second sets having the input ports equal in number to n;

a switch unit which has a plurality of input terminals, n in number, connected to the first through the n-th internal paths of the i-th input path group and output terminals, n in number, for selectively connecting the first through the n-th internal paths to said output terminals to thereby connect said output terminals of the switch unit to said first set of the input ports of the multiplexer;

an extension input interface connected to the connection switch unit for connecting an i-th one of the first through the m-th switch units to the second set of the n input ports of said multiplexer; and an output interface for connecting said output ports of the multiplexer to an i-th one of said first through said m-th output path group.

3. A cross-connect apparatus as claimed in claim 1, each of said first through said m-th elementary switch modules being specified by an i-th elementary switch module where i is a natural number between one and m, both inclusive, wherein said i-th elementary switch module comprises:

a multiplexer having first and second sets of input ports and output ports equal in number to n, each of said first and said second sets having the input ports equal in number to n;

an input interface connected to an i-th one of the first through the m-th input path groups for entering the i-th input path group as the first through the n-th internal paths of said i-th input path group to connect said first through said n-th internal paths to said first set of the input ports of the multiplexer;

an extension output interface connected to said input interface for extending said first through said n-th internal paths of said i-th input path group to said connection switch module;

an extension input interface connected to said connection switch module for entering an i-th one of said first through said m-th switch units to connect said i-th switch unit to said second set of the input ports of the multiplexer;

a switch unit which has a plurality of input terminals, n in number, connected to the output ports of the multiplexer and a plurality of output terminals, n in number, for selectively connecting the output ports of said multiplexer to said output terminals of the switch unit; and an output interface for connecting said output terminals of said switch unit to an i-th one of said first through said m-th output path group.

4. A cross-connect apparatus as claimed in claim 1, each of said first through said m-th elementary switch modules being specified by an i-th elementary switch module where i is a natural number between one and m, both inclusive, wherein said i-th elementary switch module comprises:

an input interface connected to an i-th one of the first through the m-th input path groups for entering the i-th input path group as the first through the n-th internal paths of said i-th input path group;

an extension output interface connected to said input interface for connecting said first through said n-th internal paths of said i-th input path group to said connection switch module;

an extension input interface connected to said connection switch module for entering an i-th one of said first through said m-th switch units into said i-th elementary switch unit to derive first through n-th additional internal paths from said i-th switch unit;

first through n-th multiplexers each of which has a plurality of input ports, (n+1) in number, and a single output port, said input ports of (n+1) of each of said first through said n-th multiplexers being connected to said first through said n-th internal paths extended from the input interface and to a selected one of said first through said n-th additional internal paths; and an output interface for connecting the output ports, n in number, of said first through said n-th multiplexers to an i-th one of said first through said m-th output path group.

* * * * *